3,029,247
CERTAIN TETRAHYDRO-β-CARBOLINES

Robert N. Schut, Edwardsburg, Mich., assignor to Miles Laboratories, Inc., Elkhart, Ind., a corporation of Indiana
No Drawing. Filed July 28, 1960, Ser. No. 45,814
7 Claims. (Cl. 260—296)

This invention relates to new and useful chemical compounds and especially to certain tetrahydro-β-carbolines. More specifically, the present invention pertains to 1-substituted-1,2,3,4-tetrahydro-β-carbolines corresponding to the following general formula:

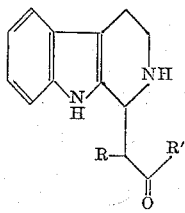

wherein R represents hydrogen or a lower alkyl group, and R' stands for a lower alkyl group or methoxy substituted phenyl groups. The lower alkyl groups preferably have a carbon content of C1 to C3; the methoxy substitutions may be mono, di or tri substitutions.

The novel compositions of this invention can be conveniently prepared by reacting tryptamine hydrochloride with a sodium hydroxymethylene ketone to obtain an α,β-unsaturated-β-aminoketone as an intermediate which upon treatment with methanolic hydrochloride yields as a crystalline hydrochloride, 1-substituted-1,2,3,4-tetrahydro-β-carboline. These reactions may be illustrated by the following equations:

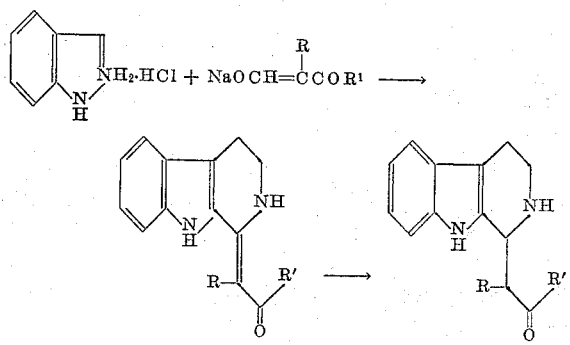

wherein R and R' have the meanings ascribed to them above.

Tryptamine hydrochloride and the sodium hydroxymethylene ketones used as starting materials are, respectively, commercially available or can be synthesized in accordance with the process description given below in Example Ia.

More particularly, the subject compounds of this invention are made in accordance with the following process description:

An aqueous solution of tryptamine hydrochloride is added to a small excess of a sodium hydroxymethylene derivative of a ketone such as acetone, methylethyl ketone, p-methoxyacetophenone, 3,4,5-trimethoxyacetophenone, etc., in aqueous solution at room temperature over a period of two hours. The brown oil which forms is extracted with ethyl acetate or chloroform and the organic layer is washed with water, dried and concentrated to give a brown syrup which can be identified by means of its infrared spectrum and N analysis as the α,β-unsaturated-β-aminoketone which corresponds to the formula given above. This syrup is dissolved in methanol and the methanolic solution saturated with hydrogen chloride. The presence of hydrochloric acid serves to catalyze the transformation of this intermediate to the corresponding tetrahydro-β-carboline and to form the hydrochloride thereof which can be collected as a white precipitate and worked up and purified by methods well known in the art.

The molecular structure of the subject compounds as drawn above was proven by the following unequivocal synthesis of one of the subject compounds, MA 721, involving the condensation of tryptamine hydrochloride with acetylpyruvic acid:

(a) *Preparation of acetylpyruvic acid.*—The experimental procedure of Claisen and Stylos [Ber. 20, 2188 (1887)] was followed. To a cold solution of sodium ethoxide in ethyl alcohol [prepared by reacting 11.5 g. (0.50 mole) of sodium and 300 ml. of absolute ethyl alcohol] was added a mixture of 29.0 g. (0.50 mole) of dry acetone and 73.0 g. (0.50 mole) of reagent grade diethyl oxalate over a two-hour period ($N_2$ atmosphere). The light yellow mixture was stirred for two hours at 0–5°, one hour at room temperature, then cooled, filtered and washed with a small amount of cold alcohol. The cream-colored solid was dried in the vacuum dessicator at room temperature to give 76 g. (85%) of sodium ethyl acetylpyruvate;

$\gamma_{max}^{KBr}$ 1725 (ester C=O), 1640 (conj. ketone C=O) cm.$^{-1}$

To a stirred solution of 27.0 g. (0.15 mole) of sodium ethyl acetylpyruvate in 300 ml. of water was added 25 ml. of 6 N sodium hydroxide over a 30-minute period. The solution was stirred at room temperature overnight. After cooling to 0°, 55 ml. of 6 N hydrochloric acid was added. The acid solution was extracted with six 100-ml. portions of ether and the extracts were dried and concentrated in vacuo (room temperature) to give 10.8 g. (56%) of the free acid as a cream-colored solid, M.P. 92–94° (reported M.P. 98°). A sample of the acid in alcohol, when treated with aqueous ferric chloride solution, gave a brownish-red color.

(b) *Preparation of 1-(2-oxopropyl)-1,2,3,4-tetrahydro-β-carboline hydrochloride.*—To a hot solution of 12.0 g. (0.061 mole) of tryptamine hydrochloride in 200 ml. of ethanol and 5 ml. of water was added a solution of 12.0 g. (0.092 mole) of acetylpyruvic acid in 75 ml. of ethanol in three equal portions over a 3-hour period. The solution was heated under reflux ($N_2$ atmosphere) for 15 hours. The dark red-brown solution was concentrated in vacuo and the residue dissolved again in a small amount of methanol. Ether was added and after cooling and scratching, the hydrochloride crystallized. Filtration and washing with ether produced 2.0 g. (12%) of 1-(2-oxopropyl) - 1,2,3,4 - tetrahydro - β - carboline hydrochloride. The crude product was recrystallized from aqueous methanol in the form of white leaflets, M.P. 225–240° (sintering). The infrared spectrum (KBr) was identical with the spectrum of the hydrochloride obtained in the reaction of sodium hydroxymethyleneacetone with tryptamine hydrochloride. The mixed melting point of the two compounds was not depressed. *Analysis.*—Calc'd for $C_{14}H_{17}ClN_2O$: Cl, 13.40. Found: Cl, 13.38.

The following examples will illustrate in greater detail the various compounds within the scope of this invention and the methods of their preparation, but these examples are not to be construed as limiting the scope of the invention.

Example 1

(a) *Preparation of sodium hydroxymethyleneacetone.*—Sodium (11.5 g., 0.50 mole) in refluxing toluene (200 ml.) was pulverized by means of a cruciform stainless steel stirrer. The toluene was decanted through a plug of glass wool and the sodium sand was covered with 250 ml. of anhydrous ether. To the stirred suspension of sodium in ether was added a mixture of 29.0 g. (0.50 mole) of dry acetone and 37.0 g. (0.50 mole) of reagent grade ethyl formate over a two-hour period (with cooling). The mixture was stirred under a nitrogen atmosphere for three hours and then allowed to stand overnight. The tan-colored sodium salt was filtered, washed with ether and dried in a vacuum desiccator to give 42.4 g. (78%) of sodium hydroxymethyleneacetone as an amorphous powder. The infrared spectrum (KBr) showed bands at 3350 (m.), 2900 (shoulder), 2740 (w.), 1660 (shoulder), 1615 (s.), 1470 (s.) and 1350 (s.) cm.$^{-1}$. The strong and rather broad absorption bands in the 1650–1350 cm.$^{-1}$ region seems to be characteristic of the salts of highly enolized $\beta$-keto aldehydes and $\beta$-keto esters.

(b) *Preparation of 1-(2-oxopropyl)-1,2,3,4-tetrahydro-$\beta$-carboline hydrochloride-MA 721.*—To a stirred solution of 13.0 g. (0.12 mole) of sodium hydroxymethylene-acetone in 100 ml. of water was added a solution of 19.7 g. (0.10 mole) of tryptamine hydrochloride in 250 ml. of water over a two-hour period. The brown oil which formed was extracted with ethyl acetate; the organic layer was washed with water, dried and concentrated to give 21.0 g. of brown syrup;

$\gamma_{max.}^{CHCl_3}$ 1640, 1560 (s., conjugated carbonyl system) cm.$^{-1}$

The syrup was dissolved in 300 ml. of methanol and the solution was saturated with hydrogen chloride. Addition of ether and cooling resulted in the formation of a white precipitate which was collected, washed with ether and dried to give 9.3 g. of the hydrochloride;

$\gamma_{max.}^{KBr}$ 1705 (s.) cm.$^{-1}$ attributable to the carbonyl stretching frequency of a normal ketone group. From the filtrate was isolated an additional 5.6 g. making a total yield of 14.9 g. (57%, based on tryptamine hydrochloride). The hydrochloride was treated with Norite and recrystallized from methanol in the form of fine white needles, M.P. 220–230° (sintering). A sample dissolved in concentrated sulfuric acid and treated with ferric chloride solution produced a deep blue color indicating the presence of a tetrahydro-$\beta$-carboline system. *Analysis.*—Calc'd for $C_{14}H_{17}ClN_2O$: Cl, 13.40. Found: Cl, 13.39.

*Example II*

*1 - (1-methyl-2-oxopropyl)-1,2,3,4-tetrahydro-$\beta$-carboline hydrochloride-MA 742.*—To a stirred solution of 30.5 g. (0.25 mole) of sodium 3-hydroxymethylene-2-butanone, prepared by the base catalyzed condensation of methylethyl ketone and ethyl formate in accordance with Example Ia, in 200 ml. of water was added a solution of 39.4 g. (0.20 mole) of tryptamine hydrochloride in 500 ml. of water over a two-hour period. The aqueous layer was decanted and the residual brown oil was washed with water, then taken up in 500 ml. of methanol. The solution was cooled to 5° and saturated with hydrogen chloride. Ether (200 ml.) was added and the mixture was allowed to stand for two hours. The crystalline solid was filtered, washed with ether and dried to give 21.0 g. (38%) of 1-(1-methyl-2-oxopropyl)-1,2,3,4-tetrahydro-$\beta$-carboline hydrochloride, M.P. 220–225° (dec.);

$\gamma_{max.}^{KBr}$ 1700

(non.-conj. ketone C=O) cm.$^{-1}$ and characteristic secondary amine hydrochloride absorption in the 2500–2800 cm.$^{-1}$ region. Recrystallization from methanol produced an analytical sample, M.P. 222–224° (dec.). *Analysis.*—Calc'd for $C_{15}H_{19}ClN_2O$: Cl, 12.72. Found: Cl, 12.95.

*Example III*

*1 - (p - methoxybenzoyl)methyl - 1,2,3,4-tetrahydro-$\beta$-carboline hydrochloride-MA 805.*—To a stirred solution of 40 g. (0.20 mole) of sodium $\omega$-hydroxymethylene-p-methoxyacetophenone, prepared by the base catalyzed condensation of the acetophenone component with ethyl formate in accordance with Example Ia, in 500 ml. of warm water (50°) was added a solution of 30 g. (0.15 mole) of tryptamine hydrochloride in 300 ml. of water over a one-hour period. After standing overnight, the aqueous layer was decanted and the residue washed with water. The brown syrup $\gamma_{max.}^{CHCl_3}$ 3550, 3330

(NH), 1625 (conj. ketone C=O, $\beta$-amino), 1600 and 1230 cm.$^{-1}$ was taken up in 200 ml. of methanol and the resulting solution was saturated with hydrogen chloride. The solid material which soon precipitated was collected, washed with ether and dried to give 40 g. of light yellow hydrochloride;

$\gamma_{max.}^{KBr}$ typical secondary amine hydrochloride absorption, 1670 (ketone C=O, conj. with aromatic ring, p-methoxy), 1605 (aromatic ring) and 1230–1220 (aromatic ether) cm.$^{-1}$. The hydrochloride was suspended in a hot methanol-ether mixture for 10 minutes, then cooled and filtered to give 30 g. (56%) of purified product, M.P. 206–207° (d.). *Analysis.*—Calc'd for $C_{20}H_{21}ClN_2O_2$: Cl, 9.94. Found: Cl, 10.02.

*Example IV*

*1 - (3,4,5 - trimethoxybenzoyl)methyl-1,2,3,4-tetrahydro-$\beta$-carboline hydrochloride-MA 818.*—When an aqueous solution of 10.0 g. (0.051 mole) of tryptamine hydrochloride was added to an aqueous solution of 17.7 g. (0.068 mole) of sodium $\omega$-hydroxymethylene-3,4,5-trimethoxyacetophenone, prepared by the base catalyzed condensation of the acetophenone component with ethyl formate in accordance with Example Ia, an oily base formed whose infrared spectrum (CHCl$_3$) showed a carbonyl band at 1635 cm.$^{-1}$ (conj. ketone C=O, $\beta$-amino). A methanolic solution of this material when saturated with hydrogen chloride yielded 11.0 g. (52%) of a hydrochloride salt, M.P. 215–216° (d.). This product was further purified by heating in aqueous methanol, cooling and filtering the ivory-colored needles (8.4 g.), M.P. 217–218° (d.);

$\gamma_{max.}^{KBr}$ typical secondary amine hydrochloride absorption, 1650 (m.) and 1670 (sh.) cm.$^{-1}$;

$\lambda_{max.}^{EtOH}$ 280 m$\mu$ the curve between 280 and 300 m$\mu$ indicates the presence of another compound. *Analysis.*—Calc'd for $C_{22}H_{25}ClN_2O_4$ Cl, 8.51. Found: Cl, 8.56.

The novel compounds of this invention have utility as physiologically active agents; they have been found to possess sedative properties. Pharmacological screens with animals at 20% of the A–LD50 have shown that MA 721, which has an A–LD50 of 490 mg./kg., sedated two out of five rats after one hour. When screening for motor relaxation by means of the rotarod method, it was seen that the compound was effective in five out of five rats one hour and four out of five three hours after administration. Furthermore, this compound protected four out of five rats one hour as well as three hours after administration against electroconvulsions. MA 742, which has an A–LD50 of 106 mg./kg., sedated three out of five rats one hour and one out of five three hours after administration, produced motor relaxation in five out of five rats one hour and four out of five three hours after administration and protected against electroconvulsions five out of five rats three hours after administration. MA 805, which has an A–LD50 of 148 mg./kg., sedated two out of five one hour and one out of five three hours after administration.

The subject compounds may also be useful as intermediates in the synthesis of indoloquinolizines of the following formula:

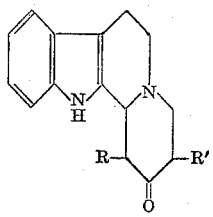

wherein R and R' are hydrogen or lower alkyl. The synthesis of this class of compounds is highly desirable in view of the sedative and 5-hydroxy-tryptamine releasing activity exhibited by reserpine and the hexahydrobenzoquinolizine derivatives of which the indoloquinolizines given above are close analogs.

By means of the reactions which represent one of the subjects of this application, compounds which are not encompassed by the general formula given above, may likewise be synthesized. Thus, for example, the reaction of α-methyl-β-(3,4-dihydroxyphenyl)ethylamine hydrobromide with sodium hydroxymethylene acetone followed by treatment of the intermediate with methanolic hydrogen chloride, yields 1-(2-oxopropyl)-3-methyl-6,7-dihydroxy-1,2,3,4-tetrahydroisoquinoline hydrochloride. This synthesis is illustrated by the following equation and the detailed process description given in Example V below:

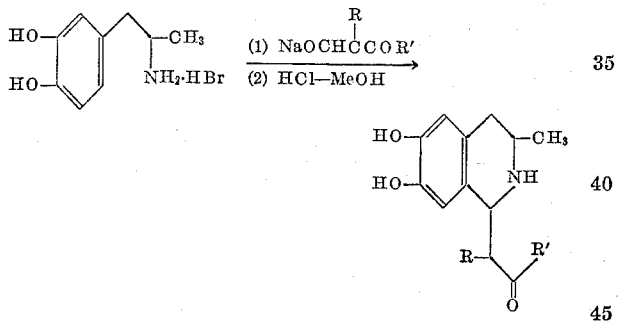

wherein R and R' have the significance given to them above.

*Example V*

*1 - (2 - oxopropyl) - 3 - methyl - 6,7 - dihydroxy-1,2,3,4-tetrahydroiso-quinoline hydrochloride-MA 803.*—A solution of 40.5 g. (0.16 mole) of α-methyl-β-(3,4-dihydroxyphenyl)-ethylamine hydrobromide in 150 ml. of water was added to a stirred solution of 27 g. (0.25 mole) of sodium hydroxy-methylene acetone in 250 ml. of water over a one-hour period. The mixture was allowed to stand overnight. The aqueous phase was decanted from the thick brown oil and extracted with ethyl acetate. The organic extract was concentrated in vacuo and the residue, along with the original oil, was taken up in 200 ml. of methanol. The methanolic solution was saturated with hydrogen chloride, then concentrated in vacuo. Ethyl acetate was added and the crude hydrochloride (very hygroscopic) was quickly filtered and dissolved in methanol. The solution was treated with Norite, filtered and concentrated in vacuo to a small volume; after cooling and scratching, the tetrahydroisoquinoline hydrochloride precipitated. The material was collected and washed with methanol to give 8.0 g. of white solid. From the filtrate there was isolated an additional 4.0 g., making a total yield of 12.0 g. (28%) from the starting hydrobromide. The infrared spectrum (KBr) showed bands at 3350 (phenolic O—H), 3180 (aromatic C—H), 2950 (aliphatic C—H), 2770 (secondary amine hydrochloride), 1705 (non-conj. ketone C=O) and 1595 (aromatic ring) cm.$^{-1}$. Recrystallization from methanol containing a small amount of water gave the hydrochloride as a white powder, M.P. 182–183°; the compound resolidified in the M.P. tube and then melted at 260–270° (d.). When dried 4 hours at 100°, the M.P. was also 260–270° (d.). *Analysis.*—Calc'd for $C_{13}H_{18}ClNO_3$: N, 5.15. Found: N (mercuric acetate titration), 5.10.

These reactions, as is obvious to men skilled in the art, may be utilized still further in the synthesis of other analogous compounds.

What is claimed is:

1. A compound selected from the group consisting of 1-substituted tetrahydro-β-carbolines of the formula

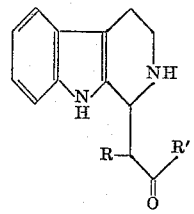

wherein R is selected from the group consisting of hydrogen and lower alkyl and R' is selected from the group consisting of lower alkyl, p-methoxyphenyl, 3,4-dimethoxyphenyl and 3,4,5-trimethoxyphenyl; and water-soluble, non-toxic acid addition salts having pharmaceutically acceptable anions.

2. 1-(2-oxopropyl)-1,2,3,4-tetrahydro-β-carboline.

3. 1 - (1 - methyl - 2 - oxopropyl) - 1,2,3,4 - tetrahydro-β-carboline.

4. 1-(p-methoxybenzoyl)methyl-1,2,3,4-tetrahydro-β-carboline.

5. 1-(3,4,5-trimethoxybenzoyl)methyl-1,2,3,4-tetrahydro-β-carboline.

6. The method of preparing a compound selected from the group consisting of 1-substituted tetrahydro-β-carbolines of the formula

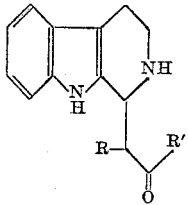

wherein R is selected from the group consisting of hydrogen and lower alkyl and R' is selected from the group consisting of lower alkyl, p-methoxyphenyl, 3,4-dimethoxyphenyl and 3,4,5-trimethoxyphenyl; and water-soluble, non-toxic acid addition salts having pharmaceutically acceptable anions, which comprises the steps of reacting tryptamine hydrochloride with a compound of the formula

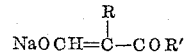

wherein R and R' have the meanings ascribed to them hereinabove in aqueous solution at room temperature over a period of about two hours to form a compound of the formula

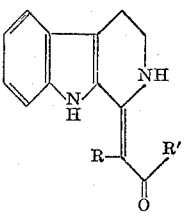

wherein R and R' have the meanings ascribed to them hereinabove and treating this intermediate with hydrogen chloride in methanol to form the desired compound.

7. The method of preparing 1-(2-oxopropyl)-1,2,3,4-tetrahydro-β-carboline hydrochloride which comprises the steps of reacting tryptamine hydrochloride with sodium hydroxymethylene acetone in aqueous solution at room temperature for about two hours to form N-(3-oxo-1-butenyl)tryptamine and treating this intermediate with hydrogen chloride in methanol to form the desired compound.

References Cited in the file of this patent

UNITED STATES PATENTS 2,843,591     Brossi et al. _____ July 15, 1958

OTHER REFERENCES

Beilstein: Handbuch der Organischen Chem., vol. 27, Main Work (1937), page 505.

Beilstein: Handbuch der Organischen Chem., vol. 27, 2d Work (1955), page 571.